E. G. BUDD & J. H. GRAVELL.
PROCESS OF WELDING.
APPLICATION FILED MAY 3, 1910.
1,042,885.
Patented Oct. 29, 1912.
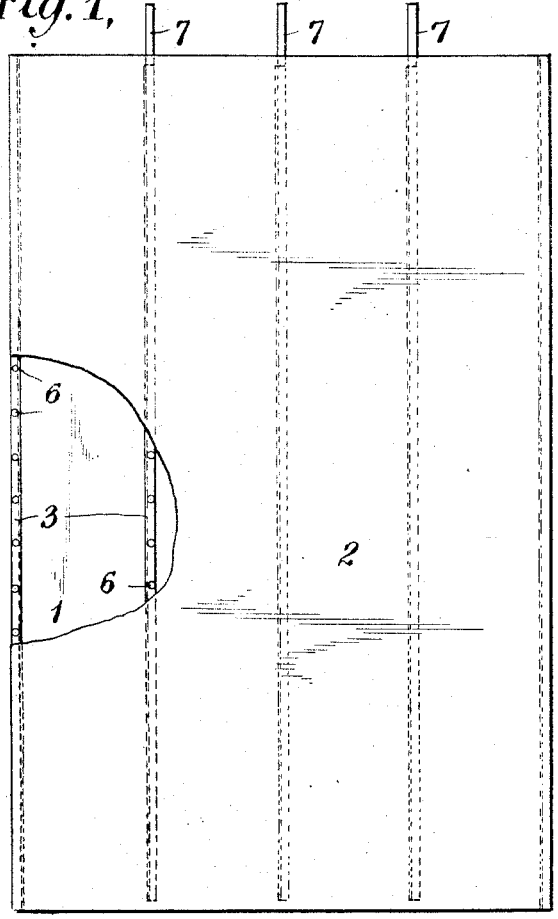
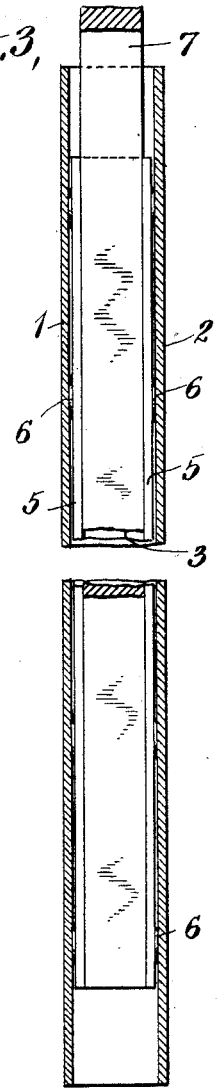
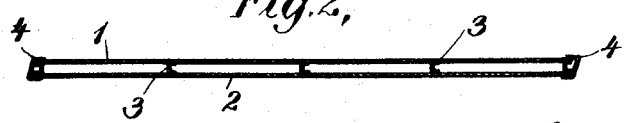
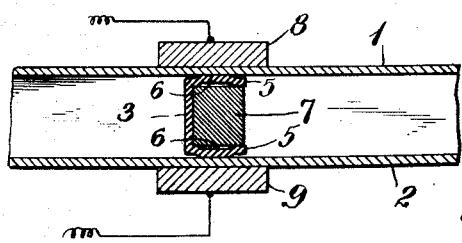
WITNESSES:
INVENTORS
Edward G. Budd
James H. Gravell
BY
ATTORNEY

UNITED STATES PATENT OFFICE.

EDWARD G. BUDD AND JAMES HARVEY GRAVELL, OF PHILADELPHIA, PENNSYLVANIA, ASSIGNORS, BY MESNE ASSIGNMENTS, TO HALE AND KILBURN COMPANY, OF PHILADELPHIA, PENNSYLVANIA, A CORPORATION OF DELAWARE.

PROCESS OF WELDING.

1,042,885.     Specification of Letters Patent.     Patented Oct. 29, 1912.

Application filed May 3, 1910. Serial No. 559,073.

*To all whom it may concern:*

Be it known that we, EDWARD G. BUDD and JAMES H. GRAVELL, citizens of the United States, residing at Philadelphia, in the county of Philadelphia and State of Pennsylvania, have invented certain new and useful Improvements in Processes of Welding, of which the following is a specification.

This invention is directed to the provision of an improved process of welding together metallic parts, adapted particularly for use in the manufacture of devices made from sheet-metal or rolled steel sections, such for instance as sheet-metal frames, doors, partitions and the like.

The object of the invention is to provide a process which may be employed in the manufacture of such devices and with which a structure is produced which possesses great strength and which is not of excessive weight.

The improved process may be utilized in the manufacture of various devices where it is desired to employ two sheet-metal parts rigidly united but spaced apart, and it consists in providing one or more spacing strips of angular or channel section between the sheet-metal parts to be united, welding these parts together and sustaining the parts against the pressure of the welding contacts during the welding operation, the means for sustaining the parts thus being such that it may be withdrawn after the welds have been made.

As this process is of particular utility in the manufacture of sheet-metal doors and partitions, we will describe it as used in that connection but it will be understood that the invention is not limited as to the uses for which it is employed.

In the manufacture of sheet-metal doors and partitions it has been the common practice heretofore to provide sheet-metal plates for the side walls of the door or partition, sheet-metal strips of angular or channel section lying between these plates so as to space them apart and rivets securely uniting the plates and strips. In order to insert these rivets, it is necessary to drill holes through the plates and strips, and after the ends of the rivets have been turned over, these ends have been filed down flush with the exterior surfaces of the plates. Furthermore, tubular metallic spacers have been provided through which the rivets extend to prevent the strips from being distorted and the plates from being drawn too close together during the operation of turning over the ends of the rivets. It is necessary to provide a great number of these rivets so that the distance between them will not be too great, because if the sheets buckle slightly between the rivets, the truss effect is lost and the structure is of insufficient strength. It will be appreciated that the great number of rivets and the tubular spacers therefor add materially to the weight of the completed structure, the assembling of the parts is expensive and the rivets showing on the exterior of the door detract from the appearance of the completed structure.

In accordance with our invention, sheet-metal plates are employed for the side walls of the door or partition and these are spaced apart by sheet-metal strips of channel section, but these parts are rigidly united by welding them together. In order to effect these welds, contacts are moved into engagement with the plates on opposite sides of one of the strips and a welding current is passed through these parts so as to reduce the metal thereof and effect a weld between each plate and the interposed strip. In order to make good welds economically it is necessary that the contacts be pressed into engagement with the plates of the door with considerable force, so much so that the sheet-metal strip between the plates would be crushed down if means were not provided for sustaining it against this pressure to which it is subjected. In order to support the sheet-metal strip during the welding operation, we employ a bar of electro-conductive material of such size that it may be inserted within one of the strips to hold the opposite flanges thereof at the required distance apart while the strip is subjected to the pressure of the welding contacts; the welds are made while this bar is in this position and thereafter the bar is removed. By welding the parts together in this way, they may be firmly united without materially increasing the weight of the completed device and the latter is of attractive appearance since the means for securing the parts together does not show on the exterior thereof. Preferably the welds by which the parts are united are made at intervals along the length of the strips between the side plates as such welding together of the parts is quite sufficient to afford the requisite strength, and to facilitate this the opposite flanges of the strips are preferably provided with raised portions at intervals into contact with which the side plates of the door or partition are pressed by the welding contacts.

Our improved process may be more clearly understood by reference to the accompanying drawings in which—

Figure 1 is a front view of the door broken away in part, Fig. 2 is a transverse section of the same, Fig. 3 is an enlarged longitudinal section showing the welding bar in position and Fig. 4 is a diagrammatic view illustrating the parts assembled in readiness for making two welds.

Referring to these drawings, a door or partition is shown consisting of two side plates 1 and 2 having a plurality of sheet-metal strips 3 of channel section between them. We have also shown sheet-metal strips 4 of channel section at the lateral edges of the door inclosing the lateral edges of the side plates 1 and 2. The side plates 1 and 2 are secured together and to the strips 3 by welding. It is unnecessary to weld the plates 1 and 2 to the strips 3 over the entire exterior surfaces of the side flanges 5 of the strips 3 since welds at intervals along the length of the strips 3 will be amply sufficient to give the required strength. To facilitate making such welds the metal of the flanges 5 is raised at intervals along the length of the strips at the points where it is desired to make the welds. Thus two of these raised portions are shown at 6 in Fig. 4. Before pressing the welding contacts into engagement with the side plates 1 and 2, a bar 7 is inserted within the strip 3, this bar being of a size corresponding to the interior of the strip 3 and being of hard electro-conductive material, preferably steel. When the bar has been inserted, as shown in Figs. 3 and 4, the parts are inserted in a welding machine and the contacts 8 and 9 are brought into engagement with the plates 1 and 2 on opposite sides of the strip 3 at the points where raised portions 6 are provided in the flanges 5 of the strips 3. These contacts 8 and 9 are then forced against the plates 1 and 2 with considerable pressure and the plates thus forced into engagement with the raised portions 6 on the strip 3, a welding current is then passed from the contact 8 through the adjacent side plate 1 to the strip 3 at one of the raised portions 6, then through the strip and the bar 7 to the other raised portion 6 and then through the plate 2 to the contact 9. This current reduces the metal of the raised portions 6 and the plates 1 and 2 sufficient to form welds at these points. When welds have been made, the pressure of the contacts 8 and 9 is relieved sufficient to permit of moving the contacts and the parts to be welded relatively so as to bring other welding points between the contacts 8 and 9, whereupon the operation is repeated. Throughout the operation of effecting the welds as thus described, the strips 3 are sustained by the welding bars 7 so that the pressure between the contacts 8 and 9, necessary to make good welds economically, will not distort the strip but the latter will maintain its original shape notwithstanding this pressure. After all the welds along the length of one or all of the strips 3 have been made, the welding bars 7 are removed since their presence within the strips 3 is no longer required.

By this process the parts for a door or partition are united so securely that a structure is provided which is of very great strength and is more nearly flat than those made by the processes which have been employed heretofore; furthermore, it will be seen that the structure is of very light weight since the securing together of the parts does not require the provision of additional means used only for this purpose.

Having described our invention, what we claim as new therein and desire to secure by Letters Patent of the United States is:

1. The process of welding which consists in assembling two sheet-metal plates on opposite sides of a metallic strip of channel section, placing a metallic bar within said strip, carrying a welding current to and from the outer sides of said plates at points thereon opposite said strip and then withdrawing said bar, substantially as set forth.

2. The process of welding which consists in providing raised portions at intervals in opposite flanges of a sheet-metal strip of channel section, assembling sheet-metal plates on opposite sides of said strip in contact with said raised portions, placing a metallic bar within said strip, carrying a welding current to and from the outer sides of said plates at points thereon opposite the raised portions on said strip and then withdrawing said bar, substantially as set forth.

3. The process of welding which consists in assembling two sheet-metal plates on opposite sides of a sheet-metal strip of channel section, pressing contacts into engagement with said plates on opposite sides of said strip, passing a welding current from one of said contacts to the other, and sustaining said strip while it is subjected to pressure by said contacts, substantially as set forth.

4. The process of welding which consists in providing raised portions at intervals in opposite flanges of a sheet-metal strip of channel section, assembling sheet-metal plates on opposite sides of said strip in contact with said raised portions, pressing contacts into engagement with said plates on opposite sides of said strip at the points of said raised portions, passing a welding current from one of said contacts to the other and sustaining said strip while it is subjected to pressure by said contacts, substantially as set forth.

This specification signed and witnessed this 29th day of April, 1910.

EDWARD G. BUDD.
JAMES HARVEY GRAVELL.

Witnesses:
 JOHN B. KILBURN,
 P. F. TUCKER.